United States Patent
Voigt et al.

(10) Patent No.: US 10,320,187 B2
(45) Date of Patent: Jun. 11, 2019

(54) APPARATUS TO PROVIDE REVERSE POLARITY PROTECTION

(71) Applicant: Aptiv Technologies Limited, St. Michael (BB)

(72) Inventors: Wolfgang Voigt, Bochum (DE); Karl-Heinz Parras, Nuremberg (DE)

(73) Assignee: Aptiv Technologies Limited (BB)

( * ) Notice: Subject to any disclaimer, the term of this patent is extended or adjusted under 35 U.S.C. 154(b) by 259 days.

(21) Appl. No.: 15/318,701

(22) PCT Filed: Jun. 29, 2015

(86) PCT No.: PCT/EP2015/064728
§ 371 (c)(1),
(2) Date: Dec. 14, 2016

(87) PCT Pub. No.: WO2016/001160
PCT Pub. Date: Jan. 7, 2016

(65) Prior Publication Data
US 2017/0126004 A1    May 4, 2017

(30) Foreign Application Priority Data
Jul. 2, 2014  (EP) .................................... 14175357

(51) Int. Cl.
*H02H 11/00* (2006.01)
*H02J 7/00* (2006.01)
(Continued)

(52) U.S. Cl.
CPC .......... *H02H 11/002* (2013.01); *H01M 2/342* (2013.01); *H02H 3/18* (2013.01);
(Continued)

(58) Field of Classification Search
CPC .......... H02H 11/002–003; H02H 3/18; H01M 2/342; H02J 7/0034
See application file for complete search history.

(56) References Cited

U.S. PATENT DOCUMENTS 3,313,995 A * 4/1967 Bach .................... H02H 11/002
320/165
4,379,989 A * 4/1983 Kurz ..................... H02J 7/0034
320/165
(Continued)

FOREIGN PATENT DOCUMENTS

| CN | 2574247 Y | 9/2003 |
|---|---|---|
| CN | 200962442 Y | 10/2007 |

(Continued)

OTHER PUBLICATIONS

"DC Polarity Protection", Elektor Electronics. Elektor Electronics, GB, vol. 5. No. 1. Jan. 1, 1979 (Jan. 1, 1979) • p. 19. XP002004705. ISSN: 0268-4519.

*Primary Examiner* — Ronald W Leja
*Assistant Examiner* — Christopher J Clark
(74) *Attorney, Agent, or Firm* — Robert J Myers

(57) ABSTRACT

An apparatus configured to protect one or more system components from damage due to reverse polarity connection of a power supply comprising a relay located between said power supply and said components, and configured to detect when a power supply is provided with reverse polarity and to consequently switch the relay to an open state to isolate said power supply from said components.

10 Claims, 6 Drawing Sheets

(51) Int. Cl.
*H02H 3/18* (2006.01)
*H01M 2/34* (2006.01)
*H02J 9/00* (2006.01)

(52) U.S. Cl.
CPC ......... *H02H 11/003* (2013.01); *H02J 7/0034* (2013.01); *H02J 9/002* (2013.01)

(56) References Cited

U.S. PATENT DOCUMENTS

| | | | | |
|---|---|---|---|---|
| 4,807,277 | A * | 2/1989 | Perry | H04M 3/301 |
| | | | | 379/102.01 |
| 5,341,082 | A * | 8/1994 | Lorenzen | H02J 7/35 |
| | | | | 320/165 |
| 5,515,559 | A | 5/1996 | Benson | |
| 5,519,557 | A | 5/1996 | Kopera et al. | |
| 5,519,559 | A * | 5/1996 | Dides | H02H 11/002 |
| | | | | 307/127 |
| 5,993,250 | A | 11/1999 | Hayman | |
| 6,133,645 | A | 10/2000 | Scribner et al. | |
| 6,632,103 | B1 * | 10/2003 | Liu | H02J 7/0034 |
| | | | | 320/105 |
| 2002/0024784 | A1 | 2/2002 | Pinto de Oliveira | |
| 2005/0116688 | A1 | 6/2005 | Yin et al. | |
| 2006/0198071 | A1 | 9/2006 | Campolo et al. | |
| 2015/0001924 | A1 * | 1/2015 | Kamiya | H01H 47/001 |
| | | | | 307/9.1 |

FOREIGN PATENT DOCUMENTS

| | | |
|---|---|---|
| CN | 201243203 Y | 5/2009 |
| CN | 201674224 U | 12/2010 |
| DE | 2743636 A1 | 4/1979 |
| DE | 2842689 A1 | 11/1979 |
| DE | 3618500 A1 | 12/1987 |
| DE | 3809576 A1 | 10/1989 |
| DE | 19815372 A1 | 10/1999 |
| DE | 10022768 A1 | 11/2001 |
| DE | 102010020294 A1 | 8/2011 |
| DE | 102010020295 A1 | 11/2011 |
| DE | 102010050767 B3 | 2/2012 |

* cited by examiner

APPARATUS TO PROVIDE REVERSE POLARITY PROTECTION

CROSS-REFERENCE TO RELATED APPLICATION

This application is a national stage application under 35 U.S.C. § 371 of PCT Application Number PCT/EP2015/064728 having an international filing date of Jun. 29, 2015, which designated the United States, said PCT application claiming the benefit of priority under Article 8 of the Patent Cooperation Treaty to European Patent Application No. 14175357.4, having a filing date of Jul. 2, 2014, the entire disclosure of each of which are hereby incorporated herein by reference.

TECHNICAL FIELD OF THE INVENTION

This disclosure relates to vehicle systems and particularly to an efficient arrangement which provides protection to vehicle systems and components if the vehicle battery or power supply is connected the wrong way round, that is to say protection from reverse polarity.

BACKGROUND OF THE INVENTION

A car battery may be inadvertently connected to the car wiring the wrong way round, i.e. with the wrong polarity. For example, during a jumpstart procedure, a second, external battery is connected to the terminals of the main battery, so as to provide a supporting voltage source during the cranking period. Accidental connection to the car wiring in reverse polarity may occur. As electronic devices are becoming important as integral parts of vehicles in greater quantities, there is a need for special provisions in each electronic device to avoid damage to circuitry and components as a result of inadvertent reverse voltage at the power supply.

It is common practice, when dealing with low or medium currents and the power loss and heat generation is low, to provide protection by inserting a serial diode between the power supply and component/circuit. However, these simple diodes cause undesirable power loss during normal operation of the devices; the power loss being equal to the forward voltage drop of the corresponding diode multiplied by the average current flowing.

Power semiconductors (even in power distribution boxes) are being used more and more nowadays as substitutes for mechanical relays and also the provide circuit protection (fusing) functionality. It is common to use power field effect transistors (FETs) in such devices as they provide a very low ON-Resistance down to 0.5 to 1 ohm and are able to carry a huge amount of permanent drain current in the range of 50 A to 100 A. A typical power FET becomes conductive via its intrinsic diode when connected in reverse polarity. This has to be avoided because high current leads to a very high power loss in the reverse diode of the FET. The consequential power dissipation may be 50 or even 100 W and would destroy the FET by overheating in a very short time leading to a great risk of fire hazard.

To overcome this problem a second power FET is known to be implemented in series arranged in opposite directions (with source of the first transistor connected to the source of the second one) to each FET switch to avoid reverse current flow. This leads inevitably to doubling of the resulting ON resistance, power loss and material costs.

FIG. 1 shows a schematic representation of how components and systems of a vehicle are protected in prior art systems. The circuit 1 shows a power supply 2 i.e. a battery, which may be incorrectly connected i.e. with reverse polarity. The battery can supply power to one or more low power loads 3 or one or more high power loads 4. To protect the low power loads diodes 5 are used between the power supply and the low power loads 3 (components). To protect the high power loads 4 (components and devices) an additional FET 6 is provided to an existing FET 7 to provide a pair of FETs arranged in series. So a second power FET 6 is implemented in series but in arranged in the opposite direction to each other (with source of the first transistor connected to the source of the second one) to avoid reverse current flow. As mentioned this leads inevitably to doubling of the resulting ON resistance, power loss and material costs.

It is known to use latching relays in vehicle systems located between the battery and the fuses and loads of vehicle systems for purposes other than to prevent damage form reverse polarity connection. FIG. 2 shows a schematic circuit diagram showing such a system. The latching relay 9 is operated by a SET coil 10 (in series with resistor 11) and a RESET coil 12 (in series with resistor 13). The latching relay 9 is controlled by SET and RESET pulses 14, 15 sent to inductive load drivers 16, 17. These inductive load drivers 16, 17 control the currents sent through the SET and RESET 10, 12 coils which in turn open/close the latching relay 9.

BRIEF SUMMARY OF THE INVENTION

It is an object of the invention to provide improved a circuitry to protect vehicle systems and component from damage as a result of inadvertent reverse polarity connection. It is a further object to provide protection which reduces power consumption of traditional solutions during normal and protective operation.

It is a further object to provide a central autonomous solution to get rid of the above mentioned problems with reverse battery which avoids additional power losses in the active state and shows a negligible power consumption in inactive or sleep mode.

In one aspect is provided an apparatus configured to protect one or more system components from damage due to reverse polarity connection of a power supply comprising a relay located between the power supply and the components, and detection means configured to detect when a power supply is provided with reverse polarity and to consequently switch the relay to an open state to isolate the power supply from the components.

The apparatus may be configured to detect when the power supply is connected with correct polarity and to consequently switch the relay to a closed state if open.

The relay may be a latching relay used for purposes other than reverse polarity detection.

The relay may include one or more coils connected to the power supply via a first switch (M3), the first switch being connected to the detection means configured to be switched on to drive current through the coils to open the relay on detection of reverse polarity.

The relay may include a SET and a RESET coil arranged in parallel and connected to the first switch such that when the reverse polarity current is detected, current is driven through the coils in opposite directions so that the coils both act in synergy to open the relay.

The configuration to detect reverse polarity may include a capacitor connected to the power supply between the relay and the components and configured to be charged as a consequence of reverse polarity to provide a voltage level, which when achieved is configured to activate the first switch (M3).

The first switch may be a power FET and further the apparatus may include a first intermediate switch (Q1) located between the capacitor and so as to switch the on the first switch (M3) when the voltage level is achieved.

The apparatus may include a diode arranged in parallel with the coil(s) configured to absorb coil energy when the first switch is switched to an OFF state.

The detection means may comprise a second switch (M2) configured to be switched on detection of correct polarity, to send current through the relay coils(s) in a direction so as to close the relay.

The relay may include a SET and a RESET coil arranged in parallel and connected to the second switch such that when correct polarity is detected, current is driven through the coils in opposite directions so that the coils both act in synergy to close the relay.

The detection means may include a second intermediate switch located between the power supply and second switch and having connection to the both sides of the power supply with respect to the relay contacts, and configured to switch on the second switch on detection of the correct polarity.

The intermediate switches may comprise transistors and or the first and second switches comprise power transistors/FETs.

BRIEF DESCRIPTION OF THE SEVERAL VIEWS OF THE DRAWING

Further features and advantages of the invention will become clear upon reading the following detailed description and studying the accompanying drawings, in which.

DETAILED DESCRIPTION OF THE INVENTION

Figure 1:
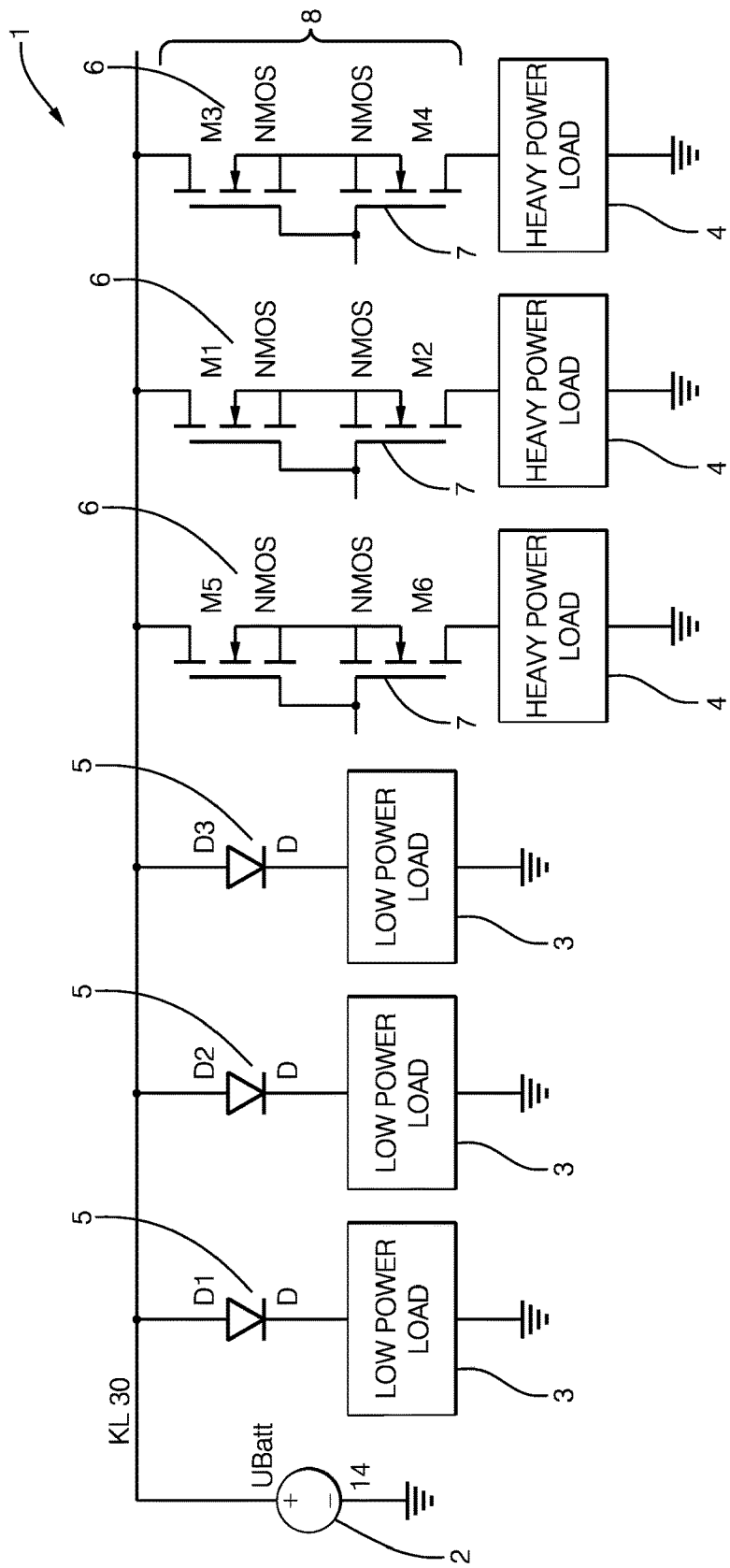
FIG. 1 shows a schematic diagram of components and systems of a vehicle protected from reverse polarity by circuitry according to the prior art.
Figure 2:
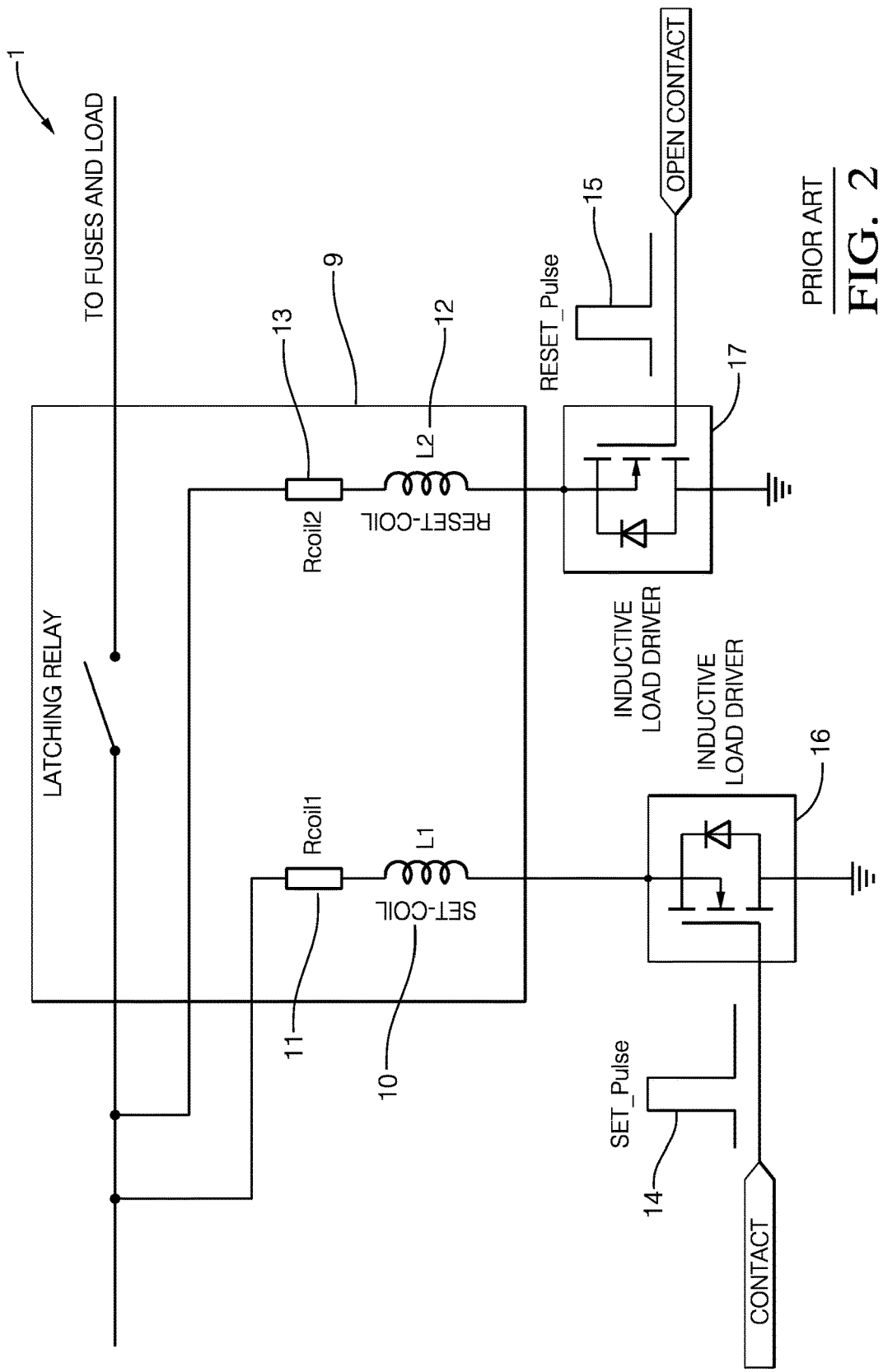
FIG. 2 shows a schematic circuit diagram showing such the use of a relay according to the prior art.
Figure 3:
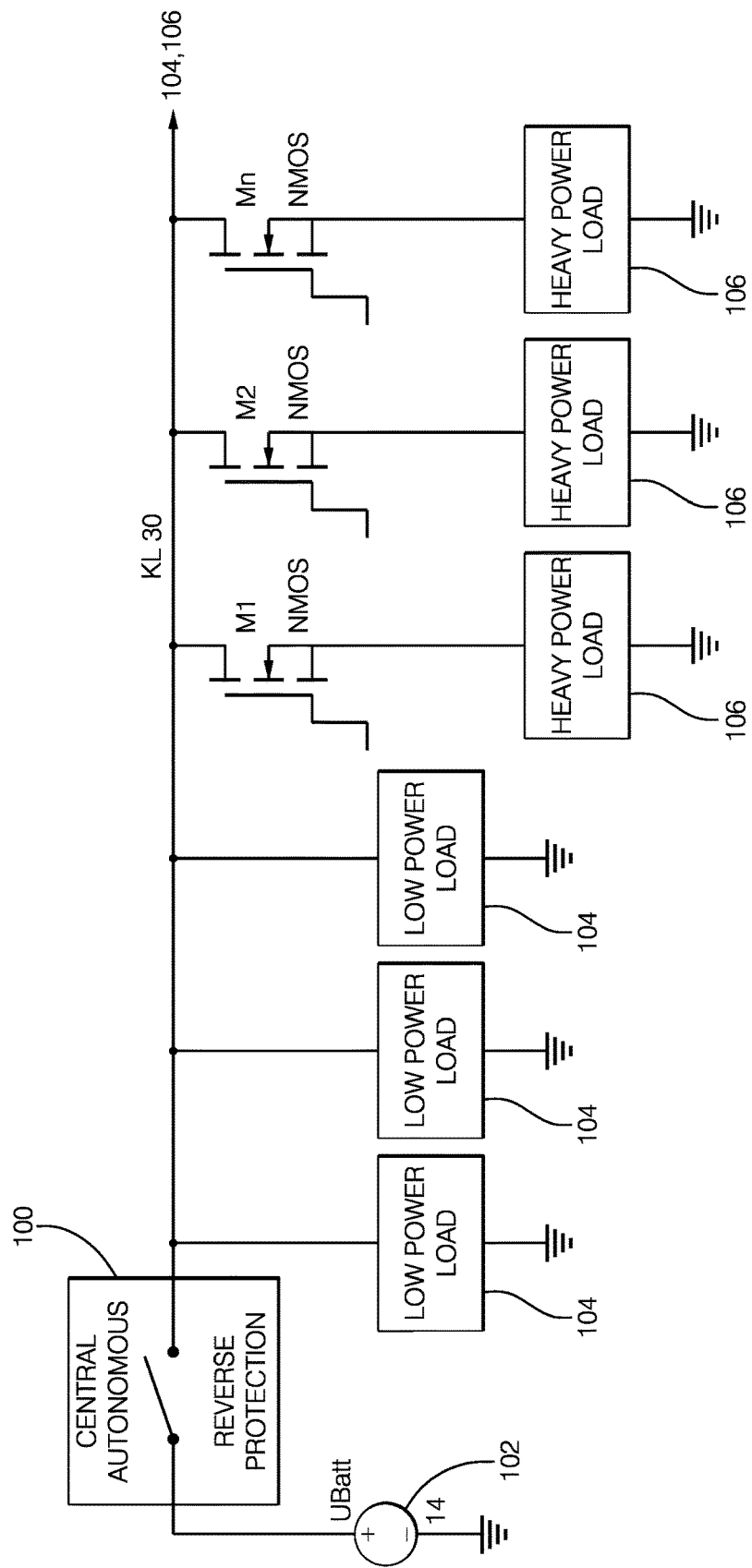
FIG. 3 shows a schematic diagram of an apparatus to provide reverse polarity protection according to an embodiment of the invention.

FIG. 3 shows a non-limiting example of an apparatus to provide reverse polarity protection circuitry 100. In essence, a central autonomous reverse polarity protection circuit/system 100 is provided between the battery 102 and the components/loads 104, 106 which obviates the need for the additional diodes with respect to the low power loads 104 and the extra FET for the high power loads 106. According to one embodiment, a latching relay is used to provide reverse polarity protection 100.

The latching relay present on current vehicle systems is used to provide reverse polarity protection 100. According to this embodiment, additional circuitry is used to control the latching relay with respect reverse polarity protection 100.

Thus, in a simple example, a latching power relay is s used as a "protection switch" which is arranged to open in a very short time after voltage reversal to isolate all sensitive electronic circuits from the power supply 102. A latching relay does not consume power during steady ON or OFF state. This provides a big advantage in comparison with using protection diodes in the power supply or implementing a second "opposite" FET in electrolytic power switches for high currents.

An appropriate electronic circuit is provided to achieve fast opening of the protection switch in case of voltage reversal and closing of the switch• as soon as the battery voltage is applied with proper polarity again. A very harsh requirement for the monitoring circuit is the low operating voltage for both polarities of 3.4 V maximum.

Figure 4A:
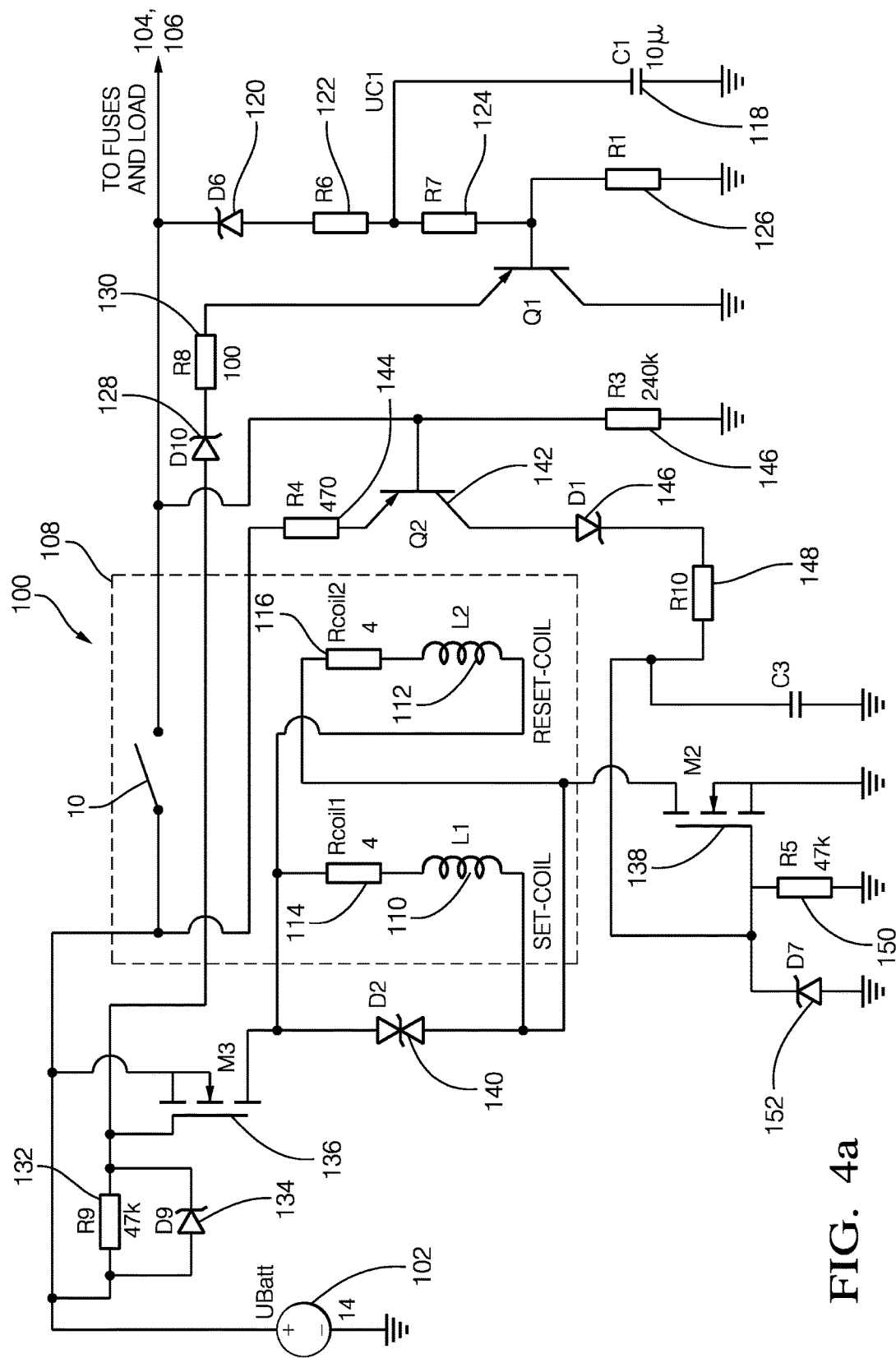
FIG. 4a shows a circuit schematic diagram of the apparatus of FIG. 3 according to an embodiment of the invention.
Figure 4B:
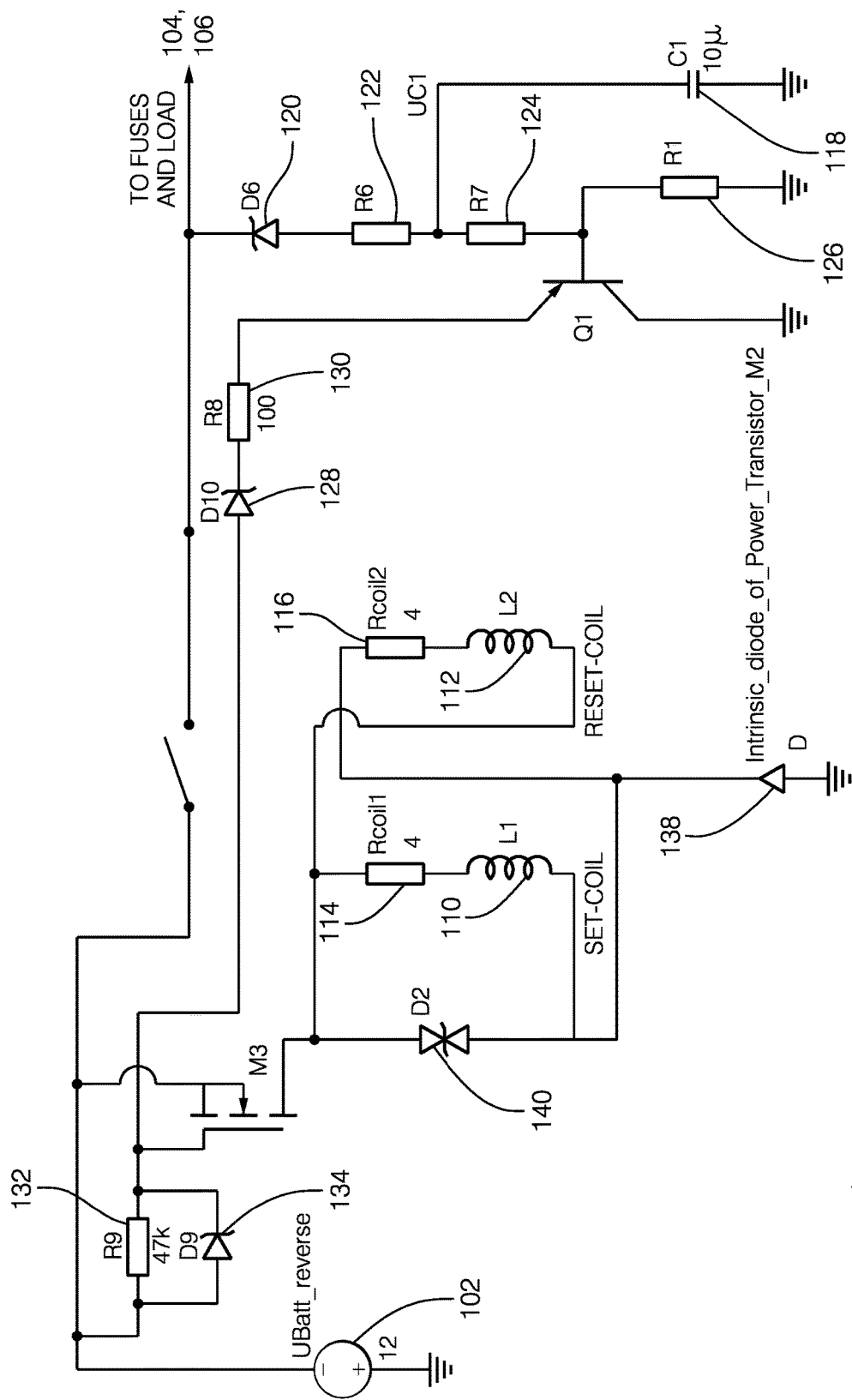
FIG. 4b shows a circuit schematic diagram of the apparatus of FIG. 3 of the circuitry to provide quick opening of the relay contact in case of reverse polarity according to an embodiment of the invention.
Figure 4C:
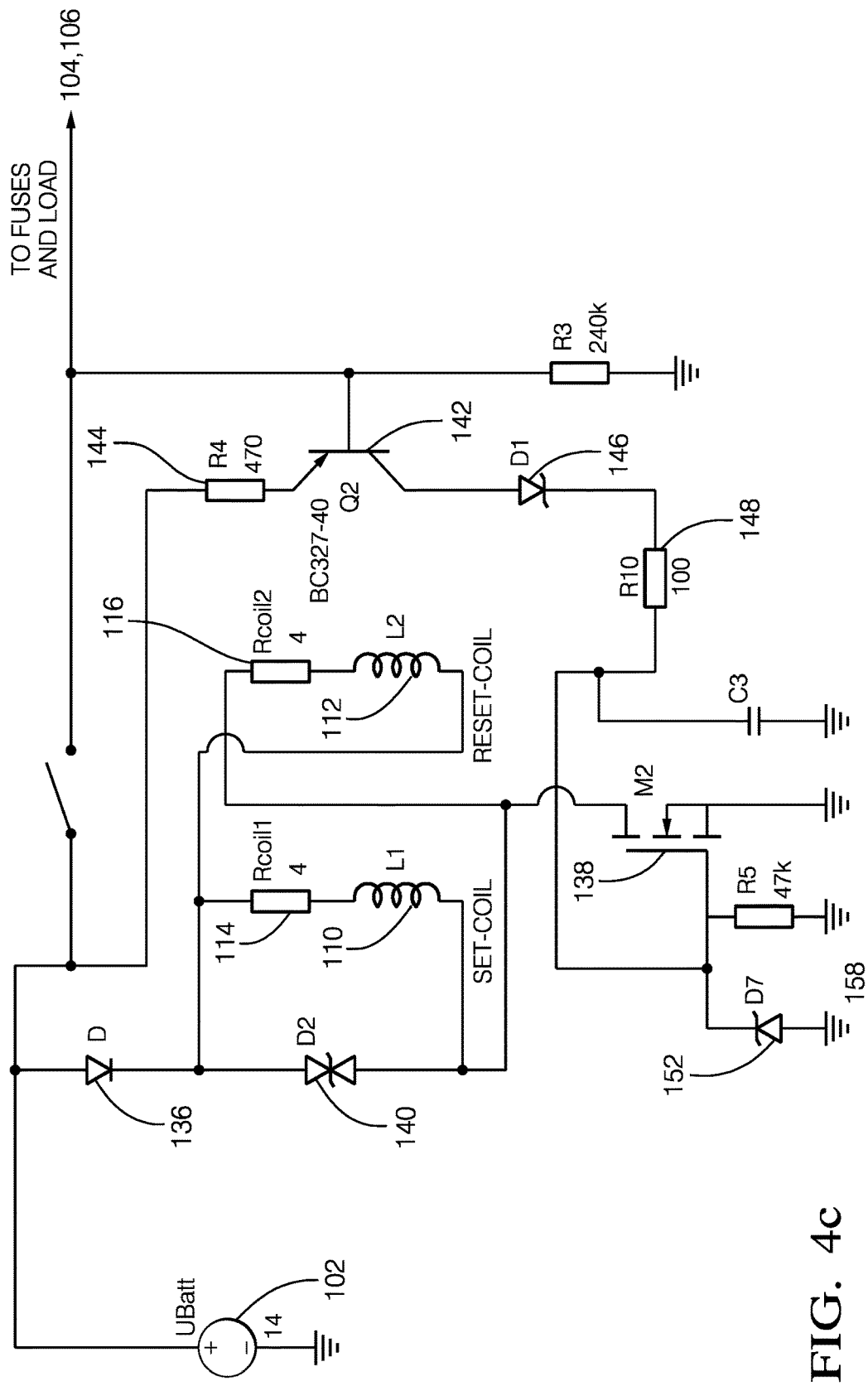
FIG. 4c shows a circuit schematic diagram of the apparatus of FIG. 3 of the circuitry to provide for closing the relay contact after reestablishing the correct polarity according to an embodiment of the invention.

FIGS. 4a-4c show a detailed non-limiting example of reverse polarity protection circuitry 100 which uses a latching relay 108 to provide reverse polarity protection.

FIG. 4a shows the overall circuitry which is used in one example. FIGS. 4b and 4c show portions of the circuitry of the FIG. 4a circuit but with selective portions missing for clarity purposes so as to help explain how the individual portion of the circuit operate.

In general the circuitry includes a latching relay 108 which may for example be a Gruner 750. The relay 108 is operated by SET coil 110 and RESET coil 112. Although FIG. 4a the relay 108 and the SET coil 110 and RESET coil 112 appear separately for clarity purposes they are co-arranged. The SET coil 110 and RESET coil 112 thus may be regarded as part of the relay 108 and so the relay 108 and SET coil 110 and RESET coil 112 to operate the relay 108 are shown in dashed lines to indicate they are co-located. The SET coil 110 and RESET coil 112 are in series with resistors 114, 116. The battery/power supply 102 which may be connected as shown.

The additional circuitry will now be described together its operation to provide reverse polarity protection. For better understanding, as mentioned, the circuit is divided in two functional parts shown by FIGS. 4b and c respectively. FIG. 4b shows the circuitry to provide quick opening of the relay 108 in case of reverse polarity and FIG. 4c shows the circuitry to provide for closing the relay 108 after establishing the correct polarity again.

Opening of the Relay Contacts in Case of Reverse Battery Polarity

The circuitry in FIG. 4b shows the circuitry which is used to open the relay 108 if the power supply 102 is connected the wrong way round, i.e. reverse polarity. It is assumed that the latching relay 108 contacts have been permanently closed during a normal operating period, either in sleep or in active mode.

As soon as the resulting battery voltage (may be during jump start) is accidentally reversed, a capacitor 118 is loaded quickly by current flow through a Zener diode 120 and resistor 122 arranged in series from a line from the main power supply 102 to the vehicle components/systems 104, 106. A line from the capacitor 118 is fed via resistor 124 to the base of a transistor 126 which is otherwise also connected via Zener diode 128 and resistor 130 (the latter two components arranged in series), and resistor 132 and diode 134 (these being arranged in parallel) to the power supply 102. When the base-emitter-voltage of transistor 126 reaches the base-emitter-tum-on-level, transistor 126 is switched on rapidly and generates a sufficient gate voltage for a Power FET 136 (supplied via a connection from the power supply 102) by driving the collector current through resistor 130, diode 128 and resistor 132. The power FET 136 is fed from power supply 102 and provides a high current to pass through the SET coil 110 and RESET coil 112. If the reverse battery voltage is very high, the gate voltage of power FET 136 is safely limited by the diode 134 (optional).

When power FET 136 is switched to the ON-state it drives its drain current through the parallel connected SET coil 110 and RESET coil 112 of the latching relay 108 and the intrinsic diode of Power FET 138. This very sharp current pulse opens the relay 108 momentarily. The action time for the latching relay 108, such as the Gruner 750, is 10 ms. It is to be noted that the current is arranged to flow in the SET and RESET coils 110, 112 by the circuitry such that they act to provide latching/unlatching force in the same direction during this operation.

To avoid repetitive bouncing of the contacts in the relay 108, the coil currents may be extended for some 20 ms to 30 ms by sustaining a sufficient base current for transistor 126 out of the charge reservoir of capacitor 118 even after opening of the latching contact. This time can be regarded as prolongation time. Suppressor diode 140 preferably functions as a freewheeling diode to absorb the energy of the coils during the time when Power FET 138 is switched to the OFF state (preferred).

Closing the Relay after Applying Correct Battery Polarity

It is assumed that the contacts of the latching relay 108 have been opened during a reverse polarity event. The additional circuitry used to control closing is shown in FIG. 4c. As soon as the battery voltage is present with the correct polarity a base current is driven through transistor 142 (which is connected via resistor 144 from a connection to the power supply 102) via base resistor 146 (and eventually via additional load resistors in parallel). Transistor 142 is switched into saturation causing a sufficient gate voltage for Power FET 138 by driving the collector current through diode 146, resistor 148, and resistor 150. Power FET 138 is provided and connected to one side of the SET and RESET coils 110, 112 and allows high current to pass through the SET and RESET coils 110, 112. In order to protect the circuitry, if the battery voltage was very high, the gate voltage of Power FET 138 is safely limited by a diode 152.

When Power FET 138 is switched to into its ON-state, it drives its drain current through the parallel connected coils of the latching relay 108 and the intrinsic diode of Power FET 136. This very "sharp" current pulse closes the relay 108. This can be achieved with the latching relay 108, such as the Gruner 750, is 10 ms. As soon as the relay 108 is closed, base and emitter of Q2 are connected by the closed contact itself and the base current for transistor 142 stops. Transistor 142 goes into the Off state, and the gate voltage of Power FET 138 is falls below the threshold voltage turning Power FET 138 to its Off state also. Optional suppressor diode 140 functions as a freewheeling diode to absorb the energy of the coils in the moment when Power FET 138 is switched to the Off state.

The above example is by way of example only and the skilled person could readily envisage alternative arrangements to provide the requisite functionality.

As mentioned a latching may be used which is designed for a continuous current of 100 A at an ambient temperature of 105° C. In-rush current can be as high as 550 A, short time overload current is defined with an amount of 3000 A, maximum make/brake current is 1500 A. Other type of latching relays may be implemented using the same circuit principle and/or design goals. The latching relay 108, such as the Gruner 750, provides two coils, one for setting and one for resetting the contact. The standard nominal operating voltage of these coils is 6 to 16 V. As a trigger voltage of 3.4 V or lower is mandatory for the protection switch.

In the example above a the latching relay 108, such as the Gruner 750, provides both SET and RESET coils 110, 112 and a particular advantage of the circuits described above is to use both coils for forced setting or resetting. Thus this doubles the magnetic flux in the armature. The circuitry as shown provides the polarity of the SET coil 110 to be inverted with respect to that for the RESET coil 112 so that both coils work in the same direction. This provision would lead to for example a trigger voltage of 3.0 Volt.

As in some circumstances voltage drops in the trigger circuitry (diode forward voltage drop, saturation 'voltage of transistors) cannot be avoided, a relay modification with lower coil resistances of 4Ω (Standard 10Ω) can be provided to compensate for these losses.

In certain examples an important item of the invention is the inherent feedback function concerning the contact position, which leads to a much better operational reliability. If the contact is open with normal polarity of the battery voltage, the coil current is provided continuously until the contact is closed totally. If the contact is closed with reversed polarity of the battery 102, the coil current is provided continuously at least (plus prolongation time) until the contact is totally open. Using the intrinsic diode of Power FET 136 to close the current path when Power FET 136 is in ON state (and vice versa) eliminates the need for additional diodes in a simple way.

The invention claimed is:

1. An apparatus configured to protect one or more system components from damage due to reversed polarity connection of a power supply, said apparatus comprising:
   a relay located between said power supply and said one or more system components, and configured to detect the reversed polarity connection to the power supply and configured to consequently open the relay to isolate said power supply from said one or more system components, wherein said relay includes a SET coil and a RESET coil each connected to the power supply; and
   a first switch connecting the power supply to the SET and RESET coils, said first switch being connected to a detection device for detecting the reversed polarity connection, said first switch configured to be switched on to drive current through the SET and RESET coils to open the relay on detection of the reversed polarity connection; and
   wherein the SET and RESET coils are arranged in parallel and connected to said first switch such that the current is driven through the SET and RESET coils in opposite directions so that said SET and RESET coils both act in synergy to open the relay when said reversed polarity connection is detected.

2. The apparatus according to claim 1, wherein the detection device is configured to detect a correct polarity connection with the power supply and consequently close the relay.

3. The apparatus according to claim 2, further comprising a second switch configured to be switched on when the correct polarity connection is detected, thereby sending the current through the SET and RESET coils to close the relay.

4. The apparatus according to claim 3, wherein said SET and RESET coils are connected to the second switch such that, the current is driven through the SET and RESET coils in opposite directions when correct polarity is detected so that said SET and RESET coils both act in synergy to close the relay.

5. The apparatus according to claim 1, wherein said relay includes the SET and RESET coils connected to the power supply via the first switch, said first switch being connected to the detection device, configured to be switched on to drive the current through the SET and RESET coils to open the relay on detection of the reversed polarity connection.

6. The apparatus according to claim 1, wherein said detection device includes a capacitor connected to said power supply between the relay and the one or more system components and configured to be charged as a consequence of reverse polarity to provide a voltage level, which when achieved, is configured to activate said first switch.

7. The apparatus according to claim 6, wherein said first switch is a power FET and said apparatus further comprises a first intermediate switch intermediate said first switch and said capacitor, said first intermediate switch configured to turn said first switch ON when said voltage level is achieved.

8. The apparatus according to claim 7, further comprising a second intermediate switch located between the power supply and a second switch and having connection to the both sides of the power supply with respect to contacts of the relay, and configured to switch on said second switch on detection of correct polarity.

9. The apparatus according to claim 8, wherein said first and second intermediate switches comprise transistors and said second switch comprises a power transistor.

10. The apparatus according to claim 1, further comprising a diode arranged in parallel with the SET and RESET coils configured to absorb coil energy when said first switch is OFF.

* * * * *